March 20, 1962 — R. W. SAVIDGE — 3,025,922
MACHINE FOR MANEUVERING AIRCRAFT ON THE GROUND
Filed Aug. 27, 1958 — 4 Sheets-Sheet 1

ROBERT W. SAVIDGE
INVENTOR.

BY Hazard & Miller

ATTORNEYS

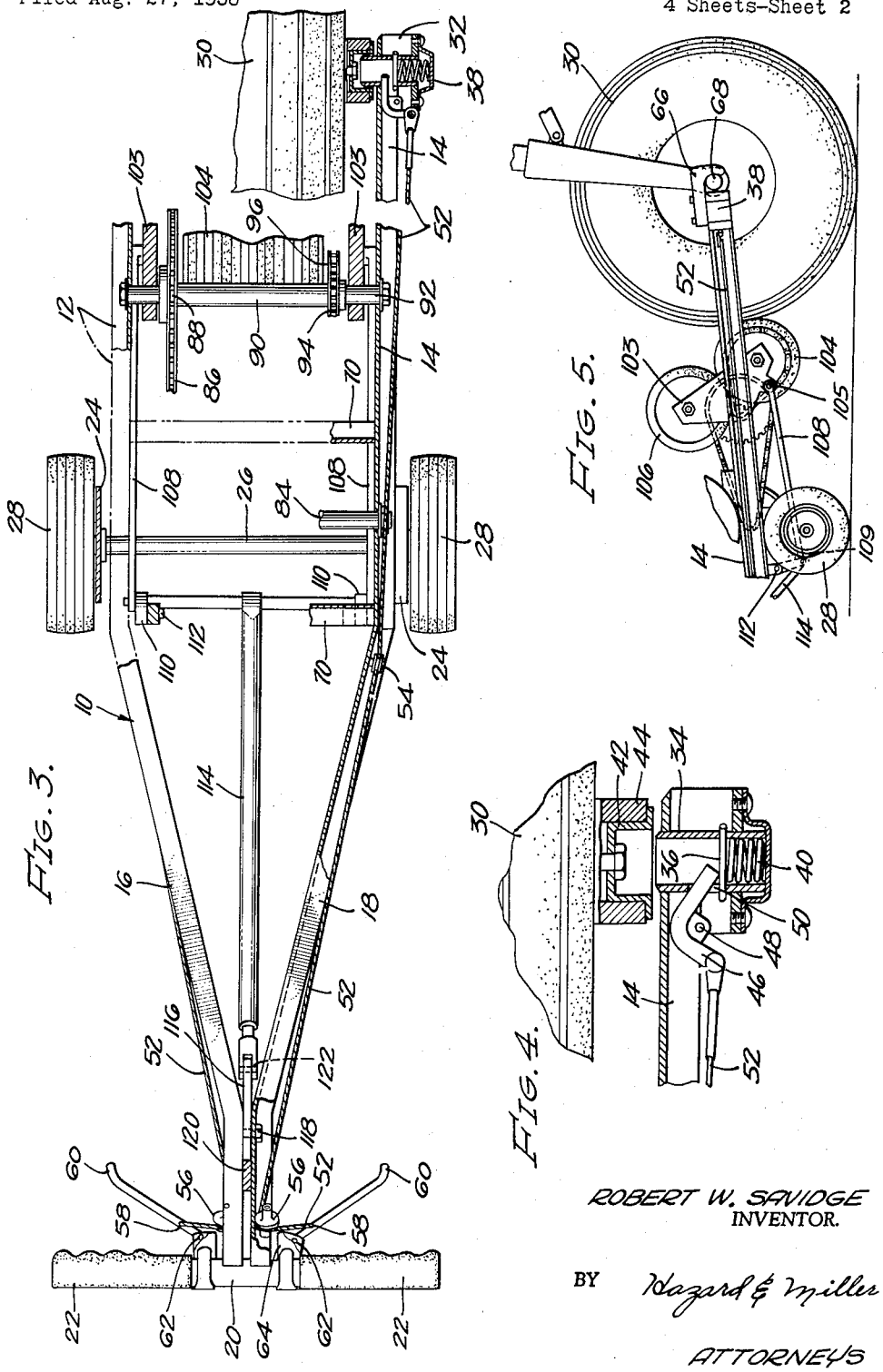

March 20, 1962 R. W. SAVIDGE 3,025,922
MACHINE FOR MANEUVERING AIRCRAFT ON THE GROUND
Filed Aug. 27, 1958 4 Sheets-Sheet 3

ROBERT W. SAVIDGE
INVENTOR.

BY Hazard & Miller

ATTORNEYS

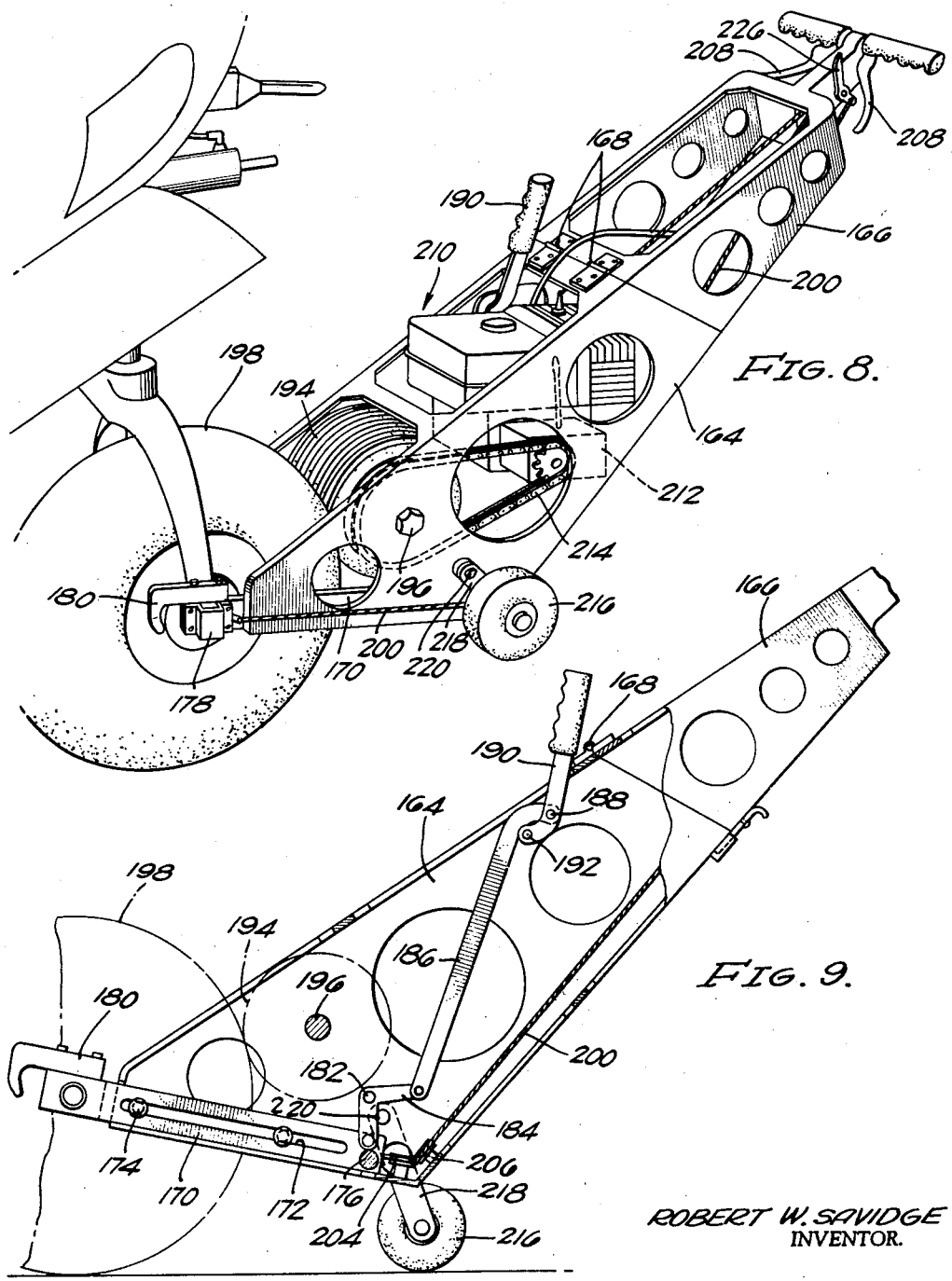

United States Patent Office 3,025,922
Patented Mar. 20, 1962

3,025,922
MACHINE FOR MANEUVERING AIRCRAFT
ON THE GROUND
Robert W. Savidge, Santa Monica, Calif., assignor to
Santa Monica Aviation, Inc., Santa Monica, Calif., a
corporation of California
Filed Aug. 27, 1958, Ser. No. 757,561
3 Claims. (Cl. 180—14)

This invention relates to a machine for maneuvering aircraft on the ground.

It is frequently necessary to move aircraft about on a hanger apron or other portions of a landing field wherein the space is too confined to move it with the power plant of the aircraft itself. For large commercial craft, four-wheel tractors are in use. These operate very successfully but they have more power than is needed and are bigger and more expensive than necessary for maneuvering and moving smaller types of aircraft. The smallest models of aircraft can be moved around on the ramp of a hangar by a single person but even this is somewhat difficult, particularly when there is a wind.

There are other types of aircraft which are smaller than the usual commercial planes but still considerably larger than the smallest pleasure craft which require the services of several men to move them about. Furthermore, there are occasions when planes land at small airfields which do not have hangar crew facilities and it is difficult for the pilot to readily maneuver his plane alone into or about a hangar.

A general object of the invention is to provide a relatively small power-driven device which will permit the moving of planes on the ground by one person rather than require the services of several people.

Another object of the invention is to provide a power device which can readily be connected to the axle ends or other convenient portion of a landing wheel, such as the nose wheel of a plane, and wherein friction drive means is provided for engaging the tire of the landing wheel so that the wheel of the plane will be rotated to move the plane over the ground and whereby the nose wheel can be steered at will.

The above and other objects of the invention will more fully appear from the following description in connection with the accompanying drawings.

FIG. 3 is an enlarged view partially in plan and partially in horizontal section with parts broken away.

FIG. 4 is an enlarged fragmentary sectional view of one of the devices for connection with the axle of an aircraft landing wheel.

FIG. 5 is a side elevational view on approximately the scale of FIG. 1 with parts broken away and showing an alternate type of connection with the aircraft landing gear assembly.

FIG. 8 is a perspective view of the embodiment of FIG. 7 in an unfolded or operating position.

FIG. 9 is a side elevational view of the embodiment of FIGS. 7 and 8 with portions broken away and in section.

Figure 1:
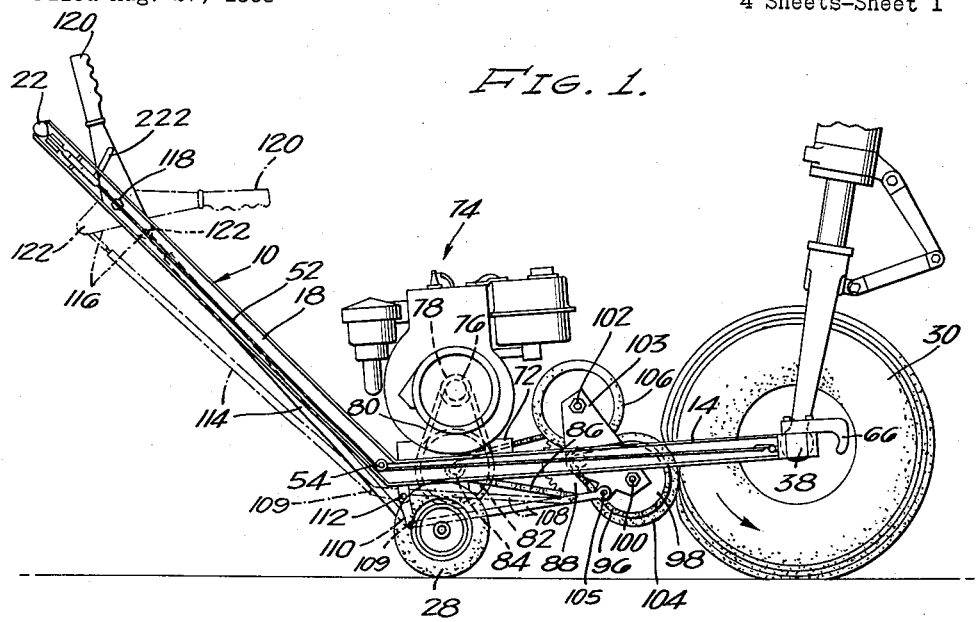
FIGURE 1 is a side elevational view of an embodiment of the invention shown in connection with the nose wheel and other portions of an aircraft landing gear assembly.
Figure 2:
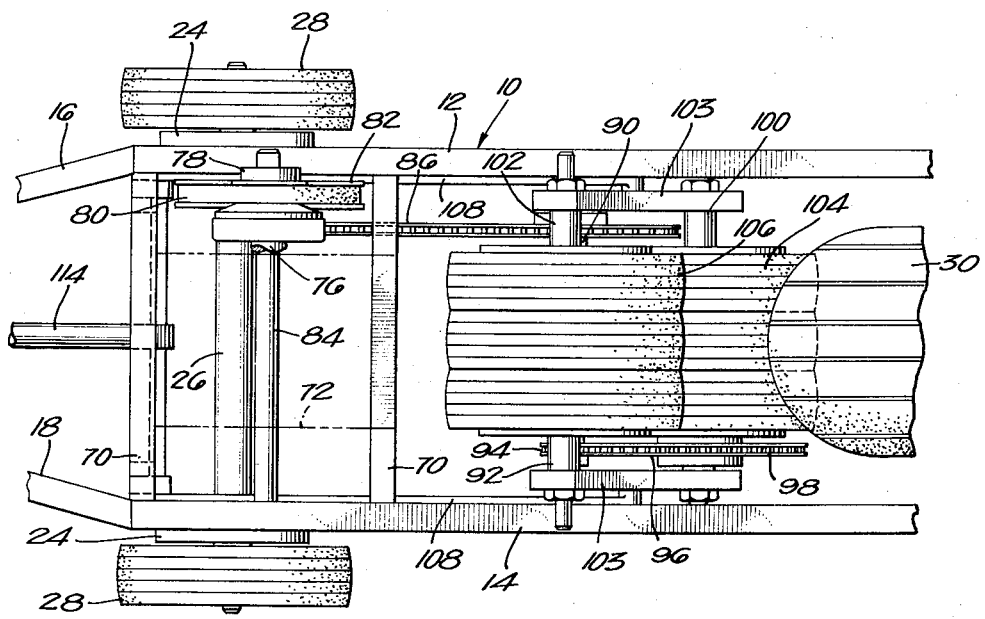
FIG. 2 is a plan view of the device with portions broken away and shown on an enlarged scale.

The structure of FIGS. 1, 2 and 3 includes a frame 10 having generally horizontal side members 12 and 14 and upwardly converging rear members 16 and 18. These converging members are suitably secured to a transfer sleeve 20 having laterally extending portions comprising handles 22.

The rear portions of the horizontal frame members 12 and 14 are provided with downwardly extending plates 24 which, between them, carry an axle 26 on the ends of which are wheels 28 of any suitable type. When not connected to a plane the device can be maneuvered on the ground by grasping the handles 22 and balancing the weight of the machine on the wheels 28, whereby it can be readily moved about.

As indicated in FIGS. 1 and 5, the forward or right end portions of the side frame members 12 and 14 are spaced apart so that they will lie at either side of an airplane nose wheel 30. In FIGS. 3 and 4 the forward end of only the frame side member 14 is shown but a similar structure to be described is carried by the forward end of the other frame member 12. The forward end of each frame member 12 and 14 carries a box-like structure 32 having oppositely disposed apertures to slidably receive a sleeve 34. Each of said sleeves has a pin 36 extending through it and between said pin and a side cap 38 is a spring 40 which normally urges the sleeve 34 inwardly. The two spring-pressed sleeves 34 on the frame members 12 and 14 are thus directed inwardly toward each other and are adapted to removably lie in a protective cup 42 in each end of the tubular axle 44 of the nose wheel 30.

In order to retract the spring-pressed sleeves 34 there is provided a bell crank 46 pivotally connected at 48 to a forward portion of each side frame member 12 and 14. The forward arm of the bell crank 46 passes through an aperture 50 in the sleeve 34 and when the bell crank is rotated clockwise the sleeve 34 will be moved against the spring 40 to retract said sleeve from the aircraft wheel hub cap 42. A flexible cable 52 has its forward end connected to the rear arm of the bell crank 46 and extends beneath a pulley 54 at the lower end of each of the converging frame members 16 and 18. The cables 52 extend upwardly along each of the converging frame members and about pulleys 56 rotatably supported at the upper ends of the frame members 16 and 18.

The rear or upper ends of the cables 52 are connected at 58 to hand levers 60 which, in turn, are pivotally mounted at 62 on a bracket 64 carried by the handle sleeve 20. Thus when the hand levers 60 are pulled toward the handles 22 the cables 52 will be pulled to retract the nose wheel hub engaging sleeves 34. On top of the box 32 which houses the spring-pressed sleeve 34 is a hook-like member 66 which, as shown in FIG. 5, is adapted to hook over a landing wheel axle end 68. This hook construction is provided for a different type of nose wheel hub which is found on certain types of aircraft and will not accommodate the spring-pressed sleeves 34.

In FIG. 2 is shown a pair of frame cross members 70 which support the base 72 of a suitable internal combustion engine 74. The engine 74 has a drive shaft 76 with a pulley 78 connected by a belt 80 to a pulley 82 on a cross shaft 84 carried between the frame side members 12 and 14. The cross shaft 84 carries a suitable sprocket (not shown) which drives a chain 86. In turn the chain drives a sprocket 88 on a sleeve 90 (FIG. 3). This sleeve is mounted on a cross shaft 92 which extends between and is supported by the side frame members 12 and 14. The sleeve 90 carries a sprocket 94 which is connected by a chain 96 to a sprocket 98 on a cross shaft 100. This cross shaft and a second similar shaft 102 are carried by plates 103 which are tiltable about the cross shaft 92. The shafts 100 and 102, respectively, carry friction drive rollers 104 and 106 which are suitably fixed to and rotate with said shafts. Furthermore, the friction rollers 104 and 106 are in frictional engagement with each other so that the positively driven roller 104 will, in turn, rotate the roller 106, but in an opposite direction of rotation.

Connected to a lower portion of the shiftable plate 103, as viewed in FIG. 1, is a link 108 which is pivotally connected thereto at 105 and extends rearwardly to pivotally connect at 109 with a rocker arm 110, the latter in turn being pivotally connected at 112 to the underside of the rear portion of the side frame 14. Another link 114 is pivotally connected to the rear end of the link 108 and rocker arm 110 at the pivot 109 and extends rearwardly and upwardly to pivotally connect with a hand lever 116. The latter has a pivotal connection 118 which lies between the convergent upper portions of the frame member 16 and 18 and said hand lever extends upwardly and terminates in a handle 120. Thus when the handle 120 is pulled rearwardly, or in a counterclockwise direction, the lower friction roller 104 will swing into engagement with the aircraft wheel tire 30 and when said handle is swung in a clockwise direction the roller 104 will disengage the tire 30 and roller 106 will engage said tire. As a result the aircraft wheel tire 30 can be rotated to move the plane either forwardly or rearwardly.

The handle 120 for shifting the friction rollers 104 and 106, at its extremes of movement, will shift the pivot point 122 at the top of the link 114 to an over-center position relative to the handle lever pivot 118. As viewed in full lines in FIG. 1, the roller 104 is in engagement with the wheel tire 30 and the pivot 122 is in an over-center position. Also, when the handle 120 is swung to the dotted line position of FIG. 1, to cause the upper friction roller 106 to engage the aircraft wheel tire, the pivot pin 109 will swing to an over-center position relative to the pivots 105 and 112, thereby locking the upper roller 103 in engagement with said tire. Continued movement of the rocker arm 110 in a clockwise direction is prevented by its engagement with the frame of the machine.

When steering of the nose wheel of the aircraft is desired, the entire power unit is lifted by its handles 22 to raise the ground wheels 28 off the ground surface and the entire unit can be swung to steer the plane. Inasmuch as the internal combustion engine 74 is a small, low horse-power engine, it is not difficult to raise the ground wheels 28 as stated above.

Figure 6:
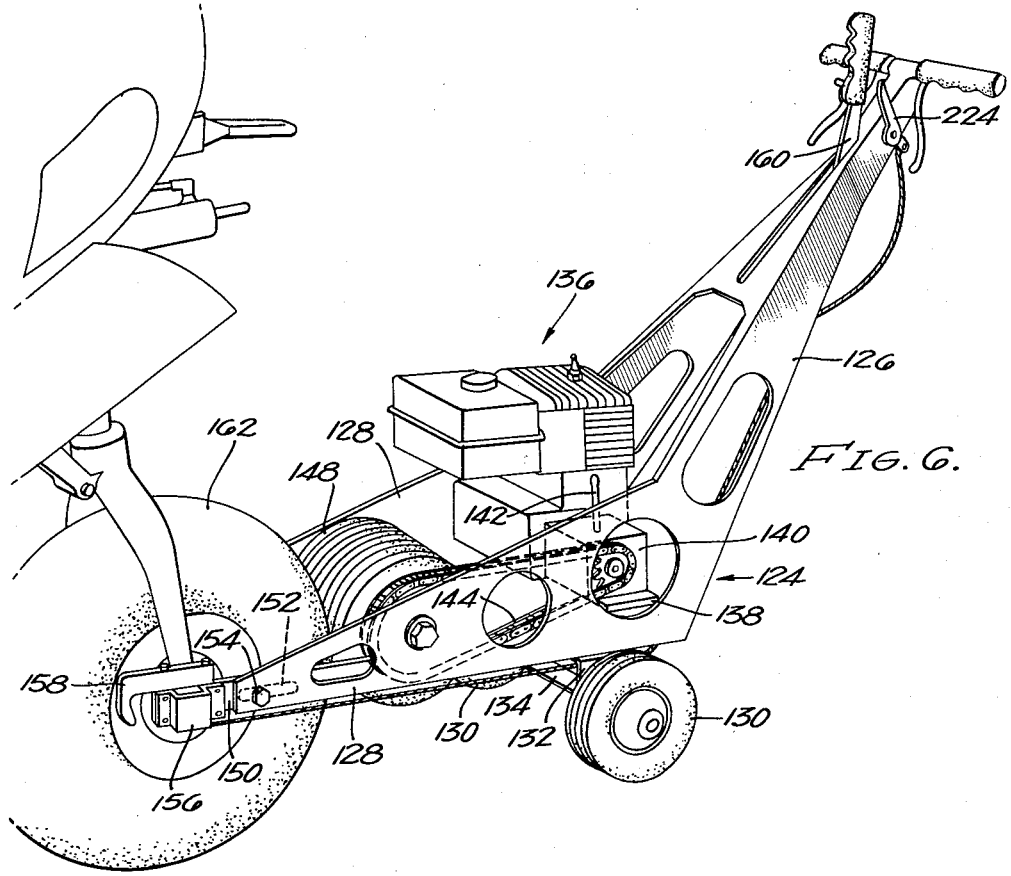
FIG. 6 is a perspective view of another embodiment of the invention which includes a single drive roller.

FIG. 6 illustrates another form of the invention wherein the frame 124 has a rearward and upward box frame portion 126 and a forward portion comprising side plates 128. The ground wheels 130 are supported from brackets 132 which carry the ground wheel axle 134. The internal combustion engine 136 is supported upon a cross plate 138 which may be welded between the forward side frame plates 128.

At the near side of the internal combustion engine, as shown in FIG. 6, is a reversing gear box 140 of conventional design having a control handle 142. The details of the reversing gear mechanism are not shown since such mechanism can readily be obtained on the market. The reverse gear assembly 140 is connected by a drive chain 144 to a suitable sprocket on a cross shaft 146 which also carries a single friction drive roller 148. This drive roller, as shown, cannot be shifted relative to the frame since its shaft 146 is fixed between the frame side plates 128.

Carried by the forward end of each frame side plate 128 is a sliding bar 150 having one or more slots 152 to receive pins 154 which extend through the side plates and into the slots 152 to serve as guides for the sliding bar 150. The forward end of the sliding bar carries a housing 156 for a spring-pressed sleeve similar to the sleeve 34 of FIG. 4. Mounted on top of the housing 156 is a hook 158 similar to the hook 66 of the first described embodiment.

At the upper portion of the rearwardly and upwardly extending frame portion 126 is a hand lever 160 which is suitably connected to the sliding bars 150 such as shown and described in connection with the embodiment of FIGS. 7, 8 and 9.

When the hand lever 160 is moved forwardly it will cause the sliding bars 150 to move forwardly so that the housing 156 and hook 158 will move away from the friction drive roller 148. Similarly when the hand lever 160 is pulled rearwardly after the nose wheel axle of the plane has been engaged, the sliding bars 150 will move rearwardly and cause the roller 148 to tightly engage the nose wheel tire 162.

With a structure of this type only one friction drive wheel is needed and reversal of the friction drive roller 148 is accomplished by the reverse gear mechanism 140.

Figure 7:
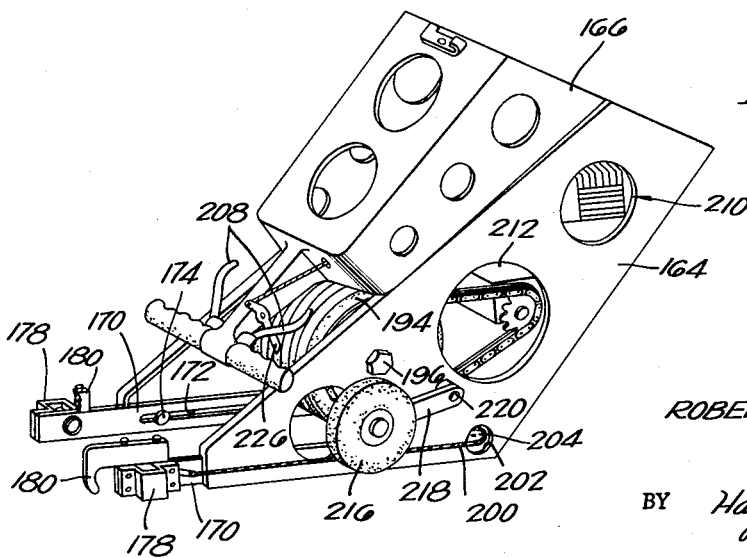
FIG. 7 is a perspective view of still another embodiment showing it in folded position.

FIGS. 7, 8 and 9 show a third embodiment of the invention which is particularly adaptable for greater portability. It can be folded to a relatively compact size so that it can be carried in a plane in the event the destination of the pilot has no ground crew facilities.

It includes a lower frame section 164 and an upper frame section 166. The two are pivotally connected as by hinges 168 so that the frame can be folded from the positions of FIGS. 8 and 9 to that of FIG. 7.

The lower portion of the lower frame section 164 is provided with sliding bars 170 each of which has an elongated slot 172 and is slidably connected to the frame by means of headed pins 174. The rear ends of the sliding bars 170 are connected by a cross member 176 so that said bars will move forwardly and rearwardly in unison. The forward end of each sliding bar 170 is provided with a housing 178 similar to that which holds the spring-pressed sleeve 134, as in FIG. 4, and a hook 180 similar to the hook 66 of FIG. 5.

Mounted above the rear end of each sliding bar 170 at 182 is a bell crank lever 184 whose depending arm is pivotally connected to the rear end of one of the sliding bars 170. The horizontal or rearwardly extending arm of the bell crank lever 184 is pivotally connected to a link 186. The upper end of this link is pivotally connected at 188 to a hand lever 190, the latter, in turn, being pivotally connected at 192 to the far side of the lower frame section 164 as viewed in FIG. 9. When the hand lever 190 is moved forwardly, it will push the link 186 downwardly and swing the bell crank lever 184 in a clockwise direction to cause the sliding bars 170 to move forwardly and thus increase their distance from a friction drive roller 194 on a cross shaft 196 between the sides of the lower frame section 164. When the hand lever 190 is pulled upwardly it will cause the sliding bars 170 to move rearwardly and engage the drive roller 194 with the aircraft wheel tire 198, the device having been suitably connected to the aircraft wheel axle in the manner described in connection with the first embodiment. This will provide adequate frictional engagement between the roller 194 and the tire 198.

As stated above, the housing 178 on the forward end of each sliding bar 170 contains a spring-pressed sleeve such as the sleeve 34 of FIG. 4. This sleeve is moved in a similar manner in the housing 178 by means of cables 200 which extend rearwardly along the outside of the lower frame section 164. The cables then extend through suitable apertures 202 (FIG. 7) and about pulleys 204 and 206, as shown in FIG. 9. Each of the cables 200 extends upwardly to a hand lever mechanism 208 which is arranged the same as the hand lever 60 in FIG. 3.

An internal combustion engine 210 is suitably mounted within the lower frame section 164 and is provided with a reversing gear mechanism 212 connected by a chain 214 to the friction drive pulley 194 in the same manner as that described in connection with the structure in FIG. 6.

If desired the device of FIGS. 6 through 9 may be supported by ground wheels 216 on a crank-shaped axle 218 so that said ground wheels can be swung to the position shown in FIG. 7 when the device is collapsed. When it is set up for operation, as in FIGS. 8 and 9, the crank-shaped axle 218 permits the wheels 216 to swing rearwardly of the cross shaft 220 a sufficient distance to prevent said wheels 216 from collapsing when the device is in use.

In FIG. 1 there is shown a lever 222 which represents a hand throttle control for the internal combustion engine and its connections are not indicated since such devices are common in machines such as internal combustion engine powered lawn mowers. A similar lever is shown at 224 in FIG. 6, and at 226 in FIG. 8.

From the foregoing description it will be seen that I have provided a relatively light and easily maneuverable power device for moving aircraft on the ground. It is adaptable for parking planes in hangars and for moving them up and down the hangar approach ramp and the area thereabout. It is a machine which considerably conserves the labor necessary for such maneuvering of aircraft since it permits a single operator to move and steer an aircraft on the ground without other assistance. Its motive power can be derived from an internal combustion engine such as used on power lawn mowers or, if desired, it could be driven by an electric motor with an extension cord although the latter power means is not as convenient because of the length of electrical conductor required.

Various changes can be made in the form, details and proportions of the various parts without departing from the spirit of the invention.

I claim:

1. A machine for maneuvering aircraft on the ground comprising a wheeled frame, means on one end of the frame engageable with the ends of an axle of a ground wheel of the aircraft, a handle at the other end of the frame, friction drive rollers rotatably mounted on the frame, power means on the frame for rotating said drive rollers in opposite directions, and means for optionally moving either of said drive rollers into and out of frictional engagement with the tire of the ground wheel so that the ground wheel can be forcibly rotated thereby in either direction.

2. A machine for maneuvering aircraft on the ground comprising a wheeled frame, means on one end of the frame engageable with the ends of an axle of a ground wheel of the aircraft, a handle at the other end of the frame, shiftable plates pivotally mounted upon the frame, friction drive rollers pivotally mounted upon the shiftable plates on opposite sides of the pivots therefor, means for rotating the drive rollers in opposite directions, and means for shifting the shiftable plates to move either friction drive roller into or out of engagement with the tire of the ground wheel whereby the ground wheel can be forcibly rotated in either direction.

3. A machine for maneuvering aircraft on the ground comprising a wheeled frame, opposed arms on one end of the frame having means engageable with the ends of an axle of a ground wheel of the aircraft, a handle at the other end of the frame, shiftable plates pivotally mounted upon the frame, friction drive rollers pivotally mounted upon the shiftable plates on opposite sides of the pivots therefor, means for rotating the friction drive rollers in opposite directions, and means mounted on the handle for shifting the shiftable plates to move either friction drive roller into or out of engagement with the tire of the ground wheel whereby the ground wheel can be forcibly rotated in either direction.

References Cited in the file of this patent

UNITED STATES PATENTS

| | | |
|---|---|---|
| 567,445 | Barrows | Sept. 8, 1896 |
| 1,598,124 | Evans | Aug. 31, 1926 |
| 2,166,450 | Smalley | July 18, 1939 |
| 2,287,955 | Zunino | June 30, 1942 |
| 2,350,791 | Mennesson | June 6, 1944 |
| 2,409,552 | Donnellan | Oct. 15, 1946 |
| 2,578,886 | Isherwood et al. | Dec. 18, 1951 |
| 2,686,571 | Horste | Aug. 17, 1954 |
| 2,751,990 | Finlay et al. | June 26, 1956 |
| 2,773,703 | Ferguson et al. | Dec. 11, 1956 |
| 2,920,845 | Palmiter | Jan. 12, 1960 |
| 2,949,972 | Wirkkala | Aug. 23, 1960 |